United States Patent
Eckardt et al.

(10) Patent No.: US 6,999,326 B2
(45) Date of Patent: Feb. 14, 2006

(54) DRIVE CONTROLLER FOR A SELF-COMMUTATED CONVERTER

(75) Inventors: Dieter Eckardt, Herzogenaurach (DE); Peter Jänicke, Erlangen (DE); Günter Schwesig, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 16 days.

(21) Appl. No.: 10/783,904

(22) Filed: Feb. 20, 2004

(65) Prior Publication Data
US 2004/0165404 A1 Aug. 26, 2004

(30) Foreign Application Priority Data
Feb. 25, 2003 (DE) ................. 103 07 999

(51) Int. Cl.
*H02M 7/125* (2006.01)
(52) U.S. Cl. ............... 363/52; 363/125; 318/254; 318/439; 318/801
(58) Field of Classification Search ........... 307/115, 307/116, 125; 323/902; 361/23, 31; 363/56.02, 363/56.03, 52, 84, 85, 125; 318/254, 439, 318/801
See application file for complete search history.

(56) References Cited

U.S. PATENT DOCUMENTS

| | | | | |
|---|---|---|---|---|
| 5,717,258 A | * | 2/1998 | Park | 307/125 |
| 6,495,986 B2 | * | 12/2002 | Schwesig | 318/801 |
| 6,573,681 B2 | * | 6/2003 | Schwesig | 318/801 |
| 6,909,255 B2 | * | 6/2005 | Jänicke et al. | 318/439 |

FOREIGN PATENT DOCUMENTS

DE  100 59 173 C1  3/2002

* cited by examiner

*Primary Examiner*—Gary L Laxton
(74) *Attorney, Agent, or Firm*—Henry M. Feiereisen

(57) ABSTRACT

A drive controller for a self-commutated converter is described. The converter has two half-bridges, and the drive controller includes a corresponding control circuit for the converter valves of each half-bridge. Each control circuit can be connected via first switches to an external voltage. Each first switch is connected in parallel with a second switch, wherein the second switches are decoupled by way of decoupling diodes. The first and second switches can be alternatingly switched on and off. The switches can therefore be cyclically tested without interrupting service.

13 Claims, 5 Drawing Sheets

DRIVE CONTROLLER FOR A SELF-COMMUTATED CONVERTER

CROSS-REFERENCES TO RELATED APPLICATIONS

This application claims the priority of German Patent Application, Serial No. 103 07 999.8, filed Feb. 25, 2003, pursuant to 35 U.S.C. 119(a)–(d), the disclosure of which is incorporated herein by reference.

BACKGROUND OF THE INVENTION

The present invention relates to a drive controller for a self-commutated converter, and more particularly to a drive controller with a switched control circuit for the converter valves that can be dynamically and cyclically tested without interrupting service.

Great care must be exercised when using electric drives in industrial automation applications, for example with numerically controlled machine-tools and robots, to protect men and machine in the best possible manner. The electrical machine or the motor should be prevented from performing dangerous movements even when a single error occurs, by implementing a "safe stop" function for the motor. This function is typically initiated depending on the operating mode, e.g., before a protective door is opened.

The "safe stop" function is implemented by disconnecting the electric power at two places, for example, by also disconnecting the motor. It is generally accepted to separately disconnect the lower and/or upper converter valves of a self-commutated converter employing a bridge circuit.

A "safe stop" function can be implemented by "safely" blocking the control signals to the converter valves, which is referred to in the art also as "pulse inhibitor", or to disconnect all converter valves.

The term "safely" is intended to indicate that the regulatory requirements imposed or suggested by the professional organizations or regulatory bodies for occupational safety are satisfied.

A conventional drive controller of this type is known from the German patent DE 100 59 173, as shown in detail in FIG. 1. The self-commutated converter W has two half-bridges with converter valves T1, T3, T5, and T2, T4, T6, respectively. The drive controller has a separate control circuit for each half-bridge. Of the control circuits, only the associated opto-couplers OK1, OK3, OK5 for the upper half-bridge, and OK2, OK4, OK6 for the lower half-bridge are shown in FIG. 1. The anodes of the photodiodes of the opto-couplers OK1, OK3, OK5 and OK2, OK4, OK6 are electrically connected with respective supply voltages SV1 and SV2, whereas the cathodes are electrically connected with corresponding pulse inhibiting circuits I1 and I2 via resistors RS1, RS3, RS5, and RS2, RS4, RS6, and forward-biased diodes DS1, DS3, DS5, and DS2, DS4, DS6 connected downstream of the resistors. The respective supply voltages SV1 and SV2 are present at corresponding outputs of pulse inhibiting paths IP1 and IP2. Each of the pulse inhibiting paths IP1 and IP2 is connected to the supply voltage SV via a corresponding switch S1 and S2, whereby the switches S1 and S2 receive control signals from associated pulse inhibiting circuits I1 and I2. The pulse inhibiting path IP1 and/or IP2 is equivalent to a disconnectable power supply which is disconnected when a "safe stop" is triggered. The output side of each pulse inhibiting path IP1 and IP2 is connected to an associated pulse inhibiting circuit I1, I2 via a diagnostic line which includes a decoupling diode, supplying corresponding diagnostic signals SV1_Diag and SV2_Diag to the pulse inhibiting circuits I1 and I2.

The function "safe stop" is implemented by a pulse inhibitor which is used to switch off the converter valves T1 to T6 of the inverter W during normal operation or when a fault is detected. Preferably, the supply voltage SV1 for the opto-couplers OK1, OK3, OK5 for the upper bridge arm, which is derived from an external voltage SV, is interrupted by switch S1 (either a mechanical or an electronic switch) by applying a signal IL1 from the pulse inhibiting circuit I1. Another supply voltage SV2 for the opto-couplers OK2, OK4, OK6 for the lower bridge arm is interrupted by switch S2 (either a mechanical or an electronic switch) by applying a signal IL2 from the pulse inhibiting circuit I2, as well as by blocking the pulses in the control set ST.

The operation of the two pulse inhibiting paths IP1 and IP2 with the switches S1 and S2 can be checked cyclically and dynamically, for example each time after the supply voltage is switched on. For this purpose, the pulse controller I1 reads the supply voltage SV1 through the signal SV1_Diag, whereas the pulse controller I2 reads the supply voltage SV2 through the signal SV2_Diag, which are provided after the switches S1 and S2, respectively. Even if one of the pulse controllers I1 and I2 fails, the other properly operating pulse inhibiting controller I2 or I1 can still respond, since the aforedescribed forced dynamical operation can detect even so-called dormant errors.

Disconnectable paths have to be tested for errors, since the probability of a component failure is never zero. As mentioned above, the function "safe stop" requires two redundant disconnectable paths which are checked at predefined test intervals, for example every eight hours. This guarantees the required protection against single faults. However, the operation of the device must be interrupted for the test, which makes more frequent tests of the disconnectable paths impractical.

It would therefore be desirable and advantageous to improve the disconnectable voltage supplies of conventional drive controllers by obviating prior art shortcomings, so that the switches of converters can be tested more frequently and at arbitrary time intervals without service interruption.

SUMMARY OF THE INVENTION

According to one aspect of the present invention, a drive controller for a self-commutated converter comprised of two half-bridges with converter valves includes two control circuits, wherein each control circuit is associated with a corresponding half-bridge and operatively connected with the converter valves of that half-bridge; first switches that are connected between a voltage supply and each of the control circuits for switchably connecting the control circuits to an external voltage; second switches that are connected electrically in parallel with the first switches in one-to-one correspondence, wherein the corresponding connected first and second switches are decoupled from each other by decoupling diodes; and controllers providing control signals to the connected first and second switches so as to alternatingly switch the connected first and second switches on and off.

By connecting a second switch electrically in parallel with each first switch and decoupling these parallel connected switches from each other by decoupling diodes, the switches can be alternatingly switches on and off and the operation and functionality of the switches can be tested without service interruption. For this purpose, the voltage at the output of each switch is measured. If one switch is disconnected for testing, the voltage is maintained in the subsequent control operation through the parallel closed path. As a result, the switches operate dynamically without service interruption.

According to another aspect of the invention, a drive controller for a self-commutated converter comprised of two half-bridges with converter valves includes two control circuits wherein each control circuit is associated with a corresponding half-bridge and operatively connected with the converter valves of that half-bridge; a circuit assembly having an output supplying a DC voltage to the control circuits; switches connected between an external voltage and an input of the circuit assembly; and controllers providing control signals to the switches so as to control the switches in a pulsed operating mode.

A common circuit assembly for supplying a DC voltage is connected after the two switches, which ensures that the supply voltage for the control circuits is not affected by testing of the input-side switches. Since these switches can be operated by clock pulses, these switches can always be tested exactly at the time when the switch is turned off.

Both embodiment of the disconnectable voltage supply have in common that the switches are continuously switched on and off while the converter is operating, without causing voltage changes at the supply inputs of the control circuits connected downstream. The state of each switch can hence be checked without service interruption, so that a forced dynamic operation without service interruption is obtained.

Embodiments of the invention may include one or more of the following features. A first set of the decoupled first and second switches can be electrically connected in series with a second set of decoupled first and second switches, so that the series connection of these two sets connects the control circuits to an external voltage. The drive controller can include two circuit assemblies, with each circuit assembly supplying a separate DC voltage to the control circuits of each half bridge, and with each switch providing the external voltage to an input of one of the circuit assemblies that is operatively connected with the respective switch. The circuit assembly supplying the DC voltage can include a rectifier, and a potential separation device can be connected before the rectifier and a support capacitor can be connected to an output of the rectifier. The potential separation device can be a coupling unit, for example, an inductive element such as a transformer, or a capacitive element.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
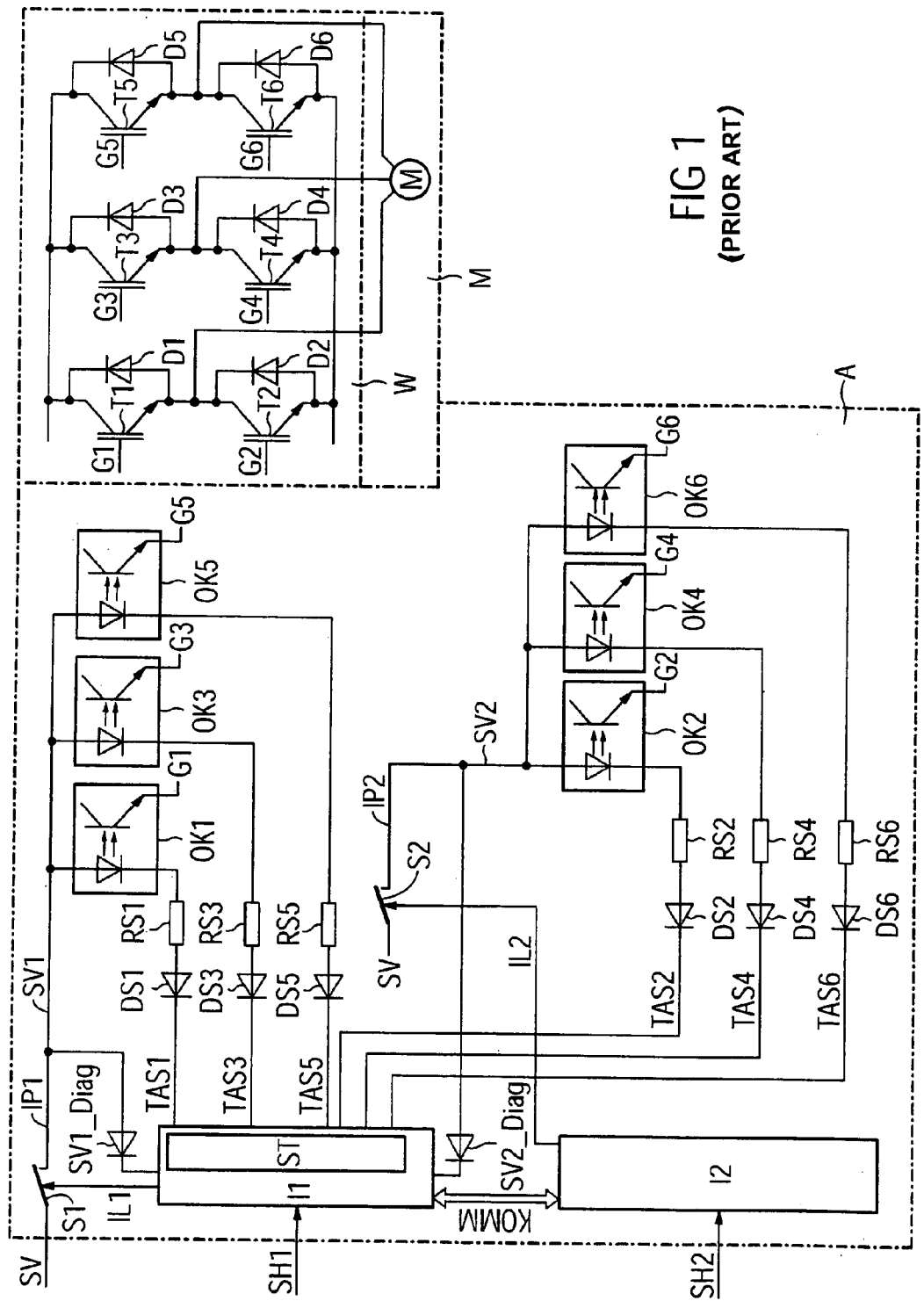
FIG. 1 is a block circuit diagram of a conventional drive controller having the function "safe stop"

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIGS. 2 to 5, there are shown block circuit diagrams of different embodiments of a drive controller according to the invention. However, unlike in the block circuit diagram of FIG. 1, the self-commutated converter W and the motor are not shown in FIGS. 2 to 5 for sake of clarity.

Figure 2:
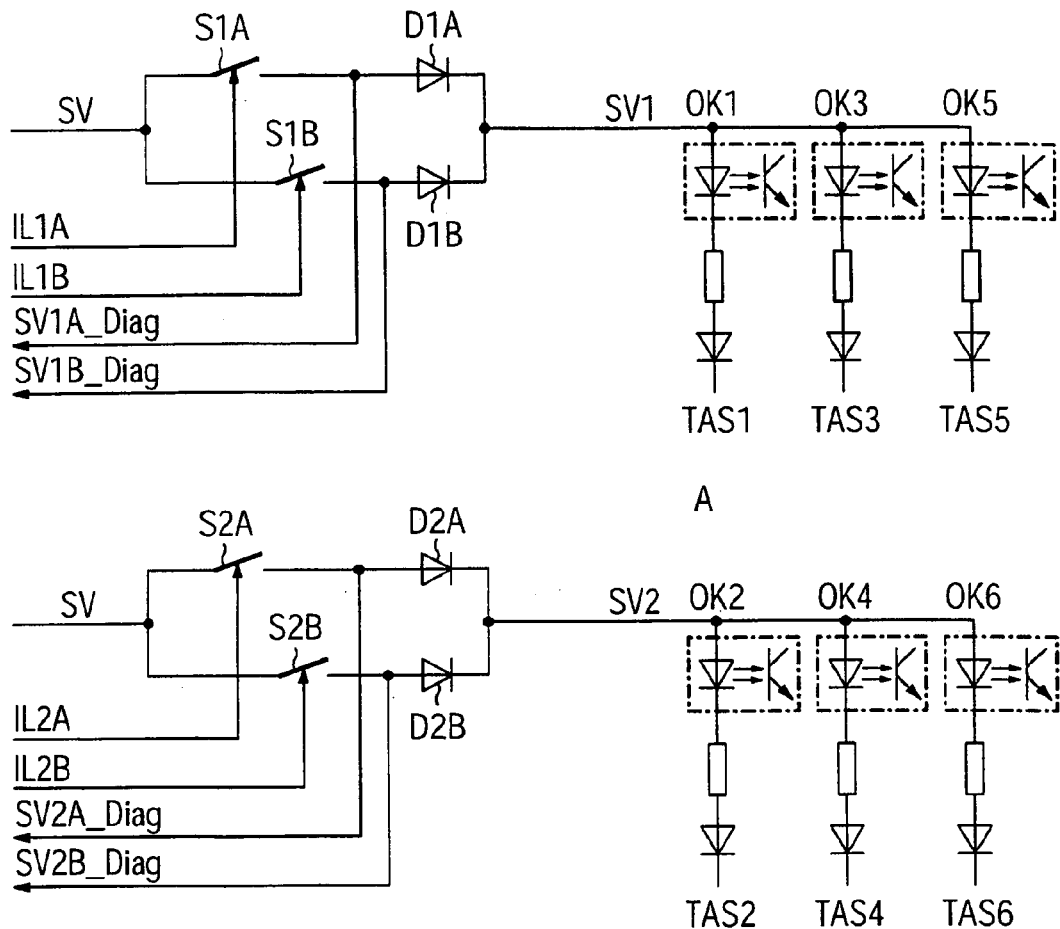
FIG. 2 is a first variant of a first embodiment of the drive controller according to the invention.

FIG. 2 shows in greater detail a first variant of a first embodiment of the drive controller AA according to the invention. The switches S1A and S2A are equivalent to the switches S1 and S2 in FIG. 1. However, unlike the conventional drive controller A depicted in FIG. 1, the disconnectable power supply that controls the control circuit for the converter valves T1, T3, T5, and T2, T4, T6, respectively, of the free running converter W depicted in FIG. 2 includes in addition a second switch S1B that is electrically connected in parallel with the switch S1A, and a second switch S2B that is electrically connected in parallel with the switch S2A. The corresponding switches S1A and S2A, and S1B and S2B, which are connected in parallel, are decoupled from each other by respective decoupling diodes D1A, D1B and D2A, D2B. The inputs of the parallel paths receive a common external voltage SV. The corresponding outputs of the parallel paths provide supply voltages SV1 and SV2 for the corresponding sets of opto-couplers OK1, OK3, OK5 and OK2, OK4, OK6, that control the control circuits for the associated sets of converter valves T1, T3, T5, and T2, T4, T6, respectively. The outputs of the switches S1A and S1B, and/or S2A and S2B, supply diagnostic signals SV1A_Diag and SV1B_Diag, and SV2A_Diag and SV2B_Diag, respectively. The controllers I1 and/or I2 apply switching signals IL1A and IL1B, and/or IL2A and IL2B, to the switches S1A and S1B, S2A and S2B. The controllers I1 and I2 in the conventional embodiment of FIG. 1 are also referred to as pulse inhibiting controllers I1 and/or I2 that control the switches S1 and S2 of the pulse inhibiting path IP1 and IP2, thereby forming a disconnectable power supply.

Referring again to FIG. 2, the switches S1A and S1B, and S2A and S2B, respectively, must be controlled in an alternating fashion for performing a cyclical test and a forced dynamic operation. As a result, one path of each disconnectable voltage supply is always closed, whereas the associated parallel path is open. The switching operation of each switch is tested by measuring the associated diagnostic signals SV1A_Diag, SV1B_Diag, SV2A_Diag, and SV2B_Diag. If at least one of the diagnostic signals SV1A_Diag, SV1B_Diag, SV2A_Diag, and SV2B_Diag is different from zero, then this indicates a fault in the switching operation, causing the self-commutated converter W to switch off.

Figure 3:
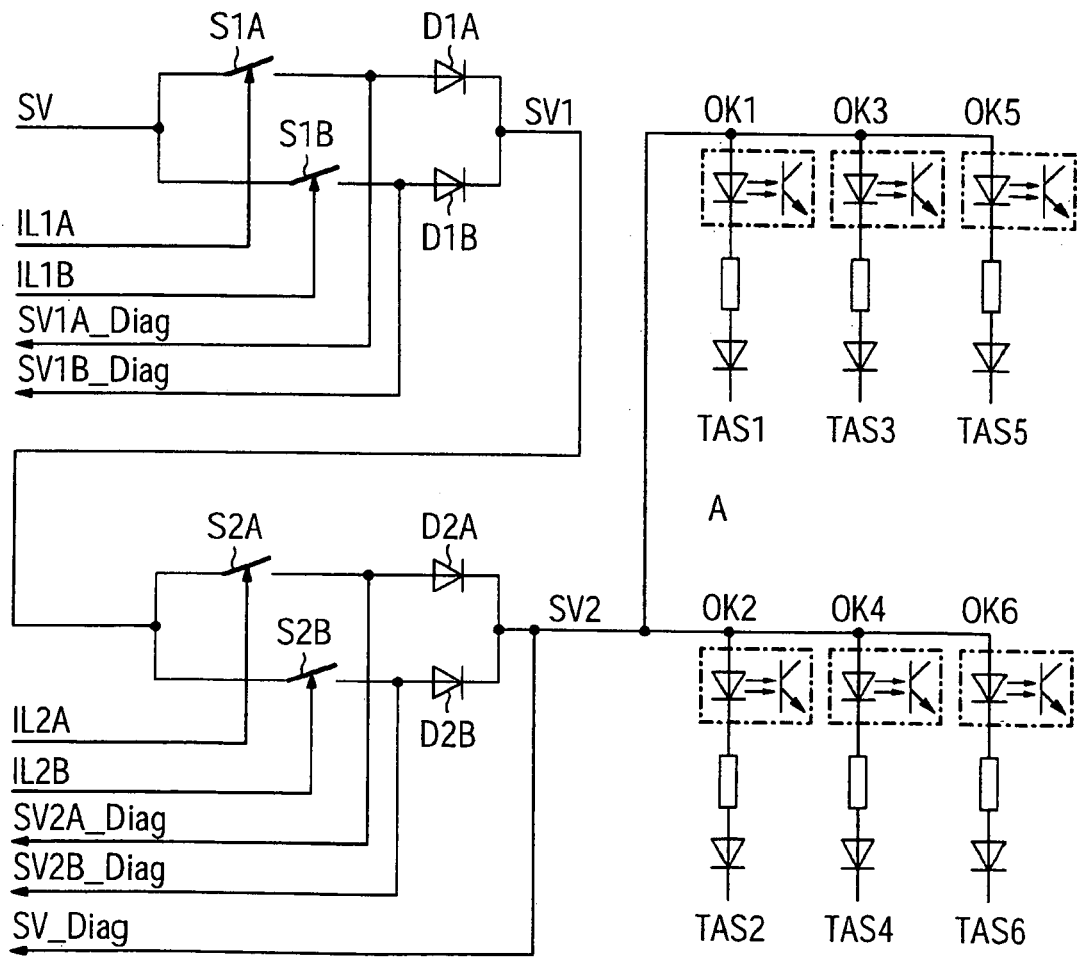
FIG. 3 is a second variant of the first embodiment of the drive controller according to the invention.

FIG. 3 shows in greater detail a second variant AB of the drive controller depicted in FIG. 2. In FIG. 3, the disconnectable power supplies in second variant are each connected with both control circuits, and not just with one control circuit, as in FIG. 2. The two disconnectable power supplies of the first variant are here electrically connected in series. In spite of the series connection of two disconnectable voltage supplies, the switches S1A and S1B and S2A and S2B can still be cyclically tested by alternatingly operating the switches S1A and S1B and S2A and S2B, respectively. The switches S1A and S1B and S2A and S2B are switched synchronously so that one path is always closed. This circuit also works if the two disconnectable power supplies that are electrically connected in series share a single voltage supply. In other words, one of the two voltage supplies that are electrically connected in parallel can be eliminated in the switching assembly depicted in FIG. 3.

Figure 4:
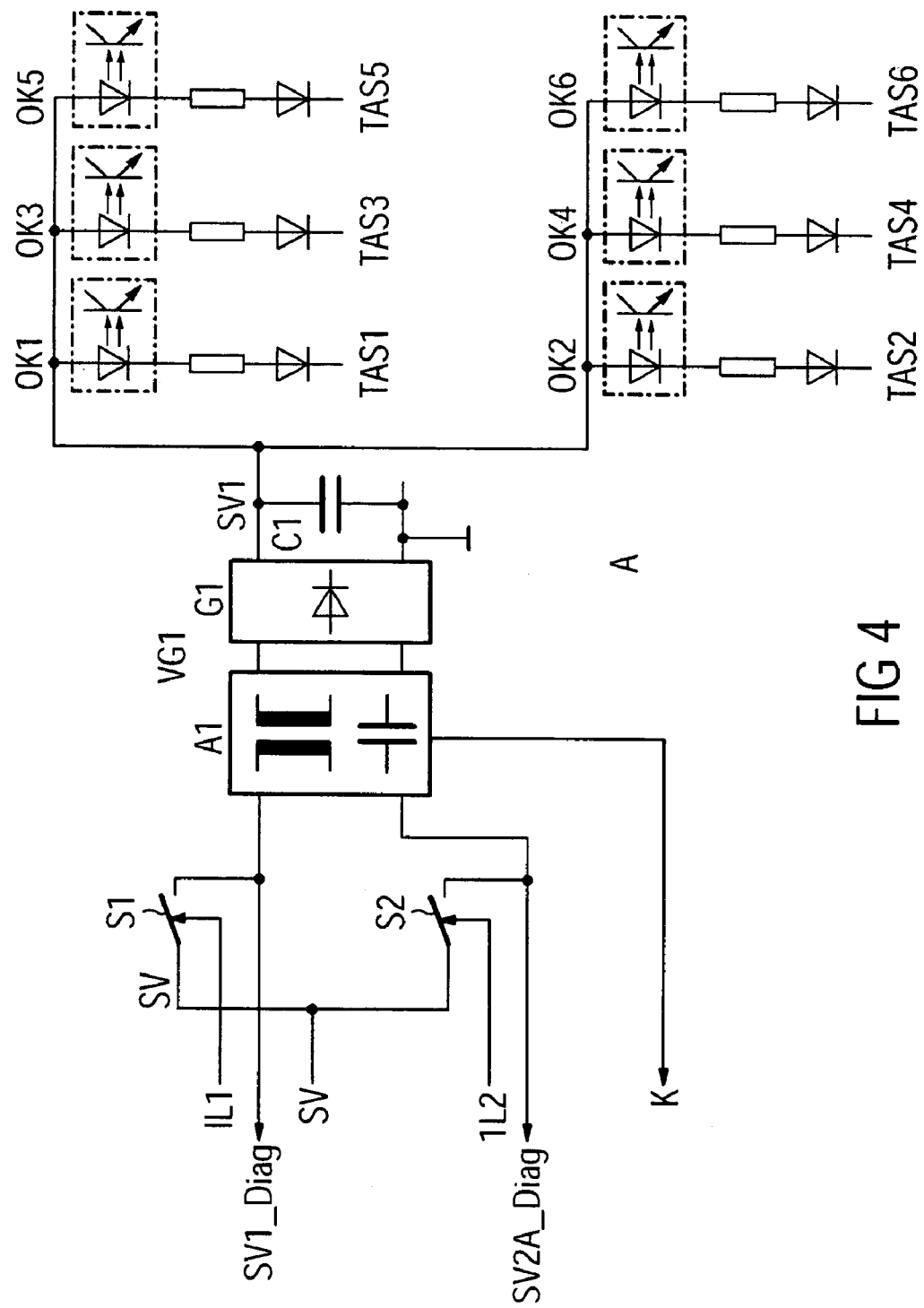
FIG. 4 is a first variant of a second embodiment of the drive controller according to the invention.

FIG. 4 shows in greater detail a first variant of a second embodiment of the drive controller AC according to the invention. A circuit assembly VG1 with a rectifier G1 that supplies DC power is connected downstream of the two switches S1 and S2. A potential separation device A1 is connected to the input of the rectifier G1, and a support capacitor C1 is connected to the output of the rectifier G1. The potential separation device A1 can be either an inductive or a capacitive coupling unit. The inputs of both switches S1 and S2 are connected in common to an external voltage SV. Like in the conventional drive controller A of FIG. 1, each output of the switches S1 and S2 supplies a diagnostic signal SV1_Diag, SV2_Diag to a corresponding controller I1 or I2. (see FIG. 1)

The two switches S1 and S2 do not perform a simple switching function, as in the conventional embodiment of the drive controller A of FIG. 1, but are pulsed. More particularly, the switches in this variant AC are pulsed in a push-pull mode. A pulsed voltage (AC value) is then generated at the output of the switches S1 and S2, which is transmitted to the rectifier G1 at a different potential. The output of rectifier G1 provides the supply voltage SV1 for the two control circuits. The voltage SV1 supplied by the rectifier G1 is smoothed by the support capacitor C1 before being used as a supply voltage.

Each time one of the two switches S1 and S2 that is pulsed in a push-pull mode is switched off, the switching operation of each switch S1, S2 is tested by analyzing the diagnostic signal SV1_Diag, SV2_Diag. When a tested switch S1 and/or S2 operates properly, the corresponding diagnostic signal SV1_Diag or SV2_Diag is zero. If a fault is detected, the signal is different from zero.

With this embodiment, a short-circuit at a switch can advantageously be detected even when the self-commutated converter W is operating. For this purpose, a diagnostic short-circuit signal K is measured at the potential separation unit A1, for example, by measuring a current flowing in the potential separation unit A1. In the event that this current goes to zero, indicating a short-circuit or an open circuit, the voltage for the opto-couplers OK1 to OK6 can still be supplied by the support capacitor C1.

Figure 5:
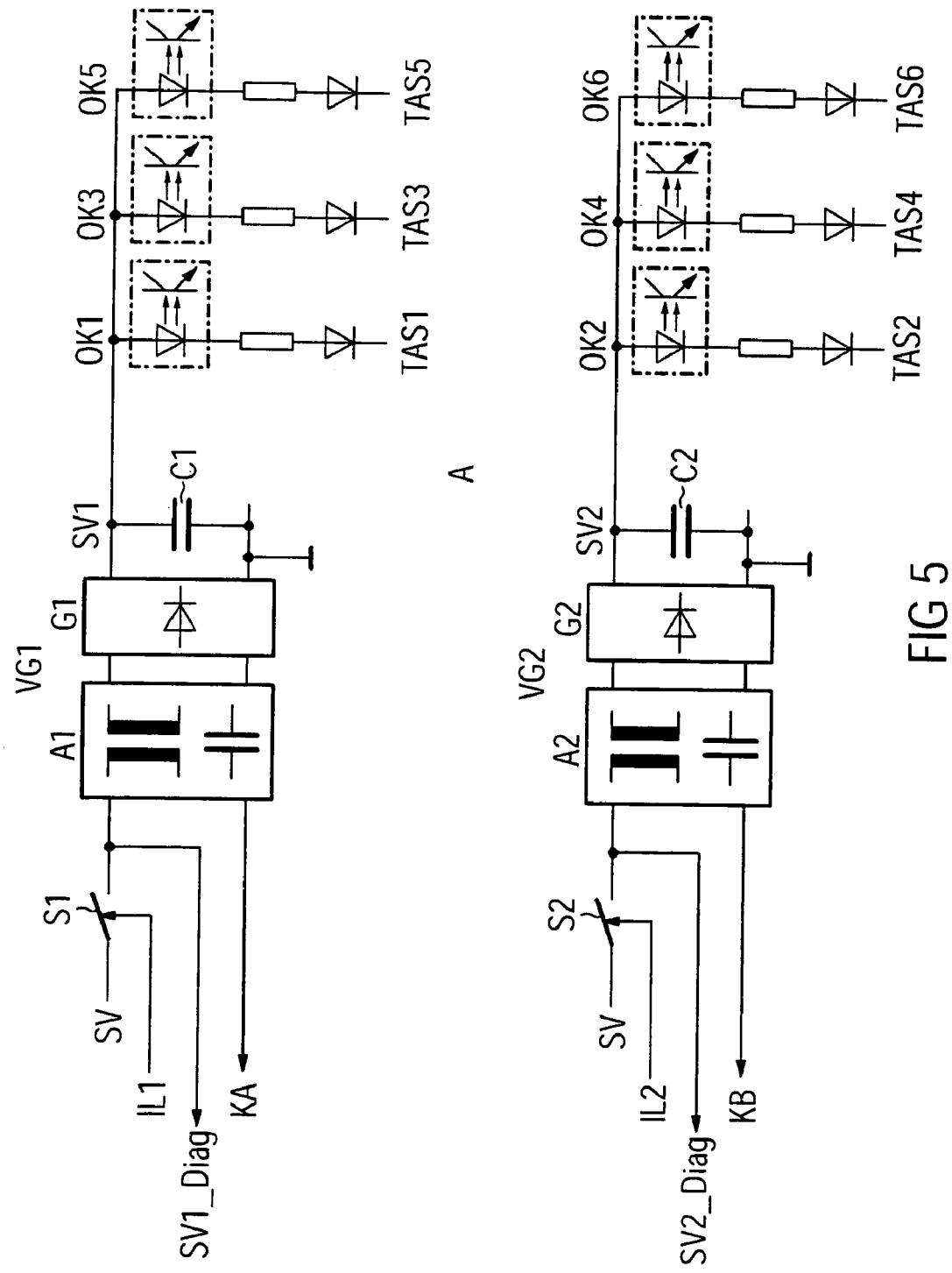
FIG. 5 is a second variant of the second embodiment of the drive controller according to the invention.

FIG. 5 shows in greater detail a second variant of the second embodiment of the drive controller AD according to the invention. This variant is different from the first variant AC of FIG. 4 in that it includes a second switching assembly VG2 that is identical to the first switching assembly VG1. The second switching assembly VG2 also supplies a DC voltage. An input of the second switching assembly VG2 is connected to the switch S2, and the output of the second switching assembly VG2 is connected to the control circuit for the converter valves T2, T4, T6 of the lower half-bridge of the self-commutated converter W. Accordingly, each of the two control circuits includes a disconnectable voltage supply according to the invention which enables cyclical testing of the switching operations of the switches S1 and S2 without service interruption. In other words, one achieves a forced dynamic mode without a service interruption.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A drive controller for a self-commutated converter having two half-bridges with converter valves, said drive controller comprising:
   two control circuits having each an input and an output, wherein the output of one control circuit is operatively connected to one of the half-bridges with its converter valves, and the output of the other control circuit is operatively connected to the other half-bridge with its converter valves;
   first switches connected between a voltage supply and the inputs of the control circuits for switchably connecting the inputs of the control circuits to an external voltage;
   second switches connected electrically in parallel with the first switches in one-to-one correspondence, said connected first and second switches being decoupled from each other by decoupling diodes and forming a set of decoupled switches; and
   control units providing control signals to the connected first and second switches so as to alternatingly switch the connected first and second switches on and off.

2. The drive controller of claim 1, wherein a first set of the decoupled switches is electrically connected in series with a second set of the decoupled switches, and wherein the series connection of the first and second sets connects the inputs of the control circuits to a common external voltage.

3. A drive controller for a self-commutated converter having two half-bridges with converter valves, said drive controller comprising:
   two control circuits having each an input and an output, wherein the output of one control circuit is operatively connected to one of the half-bridges for triggering its converter valves, and the output of the other control circuit is operatively connected to the other half-bridge for triggering its converter valves;
   a circuit assembly having an output supplying a DC voltage to the inputs of the control circuits, said inputs of the control circuits being connected in parallel;
   two switches, with each switch having an input connected between an external voltage and an output connected to an input of the circuit assembly; and
   control units providing pulsed control signals to the switches to control the switches so as to maintain the DC voltage at the inputs of the control circuits if one of the two switches is in an open position.

4. The drive controller of claim 3, wherein the circuit assembly supplying the DC voltage includes a rectifier, and wherein a potential separation device is connected before the rectifier and a support capacitor is connected to an output of the rectifier.

5. The drive controller of claim 4, wherein the potential separation device is a coupling unit.

6. The drive controller of claim 5, wherein the coupling unit is an inductive element.

7. The drive controller of claim 5, wherein the coupling unit is a capacitive element.

8. A drive controller for a self-commutated converter having two half-bridges with converter valves, said drive controller comprising:
- two control circuits having each an input and an output, wherein the output of one control circuit is operatively connected to one of the half-bridges for triggering its converter valves, and the output of the other control circuit is operatively connected to the other half-bridge far triggering its converter valves;
- a circuit assembly having a rectifier with an output supplying a DC voltage to the inputs of the control circuits, said rectifier including a potential separation device connected before the rectifier and a support capacitor connected to an output of the rectifier;
- two switches connected between an external voltage and an input of the circuit assembly; and
- control units providing control signals to the switches so as to control the switches in a pulsed operating mode.

9. The drive controller of claim 8, and further comprising two circuit assemblies, with each circuit assembly separately supplying a DC voltage to a corresponding input of the control circuit of a half bridge, and with one of the switches providing the external voltage to an input of one of the circuit assemblies that is operatively connected with the one switch, and the other switch providing the external voltage to an input of the other circuit assembly that is operatively connected with the other switch.

10. The drive controller of claim 9, wherein the circuit assembly supplying the DC voltage includes a rectifier, and wherein a potential separation device is connected before the rectifier and a support capacitor is connected to an output of the rectifier.

11. The drive controller of claim 10, wherein the potential separation device is a coupling unit.

12. The drive controller of claim 10, wherein the coupling unit is an inductive element.

13. The drive controller of claim 10, wherein the coupling unit is a capacitive element.

* * * * *

UNITED STATES PATENT AND TRADEMARK OFFICE
CERTIFICATE OF CORRECTION

PATENT NO.    : 6,999,326 B2 Page 1 of 1
DATED         : February 14, 2006
INVENTOR(S)   : Dieter Eckardt, Peter Jänicke and Günter Schwesig It is certified that error appears in the above-identified patent and that said Letters Patent is hereby corrected as shown below:

Column 7,
Line 13, change "far" to -- for --.

Signed and Sealed this

Sixteenth Day of May, 2006

JON W. DUDAS
*Director of the United States Patent and Trademark Office*